(12) United States Patent
Schuver et al.

(10) Patent No.: US 8,090,601 B2
(45) Date of Patent: *Jan. 3, 2012

(54) SYSTEM AND METHOD FOR DETERMINING A PREMIUM FOR INSURANCE FOR A SECURITY

(75) Inventors: Steven S. Schuver, St. Louis, MO (US); David D. Schuver, St. Louis, MO (US); Thomas L. Bakos, Ridgway, CO (US)

(73) Assignee: SBH, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/135,715

(22) Filed: Jul. 13, 2011

(65) Prior Publication Data

US 2011/0270634 A1 Nov. 3, 2011

Related U.S. Application Data

(63) Continuation of application No. 11/336,671, filed on Jan. 20, 2006, which is a continuation-in-part of application No. 10/875,704, filed on Jun. 24, 2004, now abandoned.

(51) Int. Cl.
*G06Q 40/00* (2006.01)
(52) U.S. Cl. ......................................................... 705/4
(58) Field of Classification Search ................ 705/4, 35, 705/36, 37, 38
See application file for complete search history.

(56) References Cited

U.S. PATENT DOCUMENTS

| 6,049,783 A * | 4/2000 | Segal et al. ..................... 705/37 |
| 2002/0042763 A1* | 4/2002 | Pillay et al. ..................... 705/35 |
| 2003/0144944 A1* | 7/2003 | Kalt et al. ....................... 705/37 |

OTHER PUBLICATIONS

Iskandar S Hamwi, & Edward Nissan. (1984). Determination of Net Rate in Property and Liability Insurance: An Alternative Approach :Purpose and Scope. Journal of Risk and Insurance (pre-1986), 51(3), 536.*

* cited by examiner

*Primary Examiner* — Rajesh Khattar
(74) *Attorney, Agent, or Firm* — David H. Chervitz

(57) ABSTRACT

A method for determining a premium for insuring a security comprising the steps of determining an insurance risk premium based upon a security to be insured, determining an expense and profit load, and combining the insurance risk premium and the expense and profit load to determine a total gross premium. A system for determining a premium for insuring a security comprises a computer system capable of having entered information related to a security to be insured, the computer system having a program for calculating an insurance risk premium based upon a security to be insured, for calculating an expense and profit load, and for combining the insurance risk premium and the expense and profit load to determine a total gross premium.

17 Claims, 7 Drawing Sheets

SYSTEM AND METHOD FOR DETERMINING A PREMIUM FOR INSURANCE FOR A SECURITY

CROSS REFERENCE TO RELATED APPLICATIONS

This application is a continuation of U.S. patent application Ser. No. 11/336,671 filed on Jan. 20, 2006, which was a continuation-in-part of U.S. patent application Ser. No. 10/875,704 filed on Jun. 24, 2004 now abandoned.

BACKGROUND

This disclosure relates to protecting a security, securities, a portfolio of securities, or a portion of a portfolio of securities and more particularly to a system and method for determining a premium for insurance for a security.

Investors may invest in numerous types of securities in an attempt to achieve short-term or long-term appreciation in the price or value of the security. In particular, an investor among other things may invest in or obtain an interest in stocks, mutual funds, options, commodities, futures, derivatives, stock index futures, certificates of deposit, exchange traded funds, or bonds by purchasing such securities. Initially, such securities or assets have a purchase price or basis. The investor attempts to maximize the return on investment by selecting assets or securities that either increase in value or do not allow their principal to erode or decline in value. Due to the unpredictable and volatile nature of securities, investors may find it advantageous to protect the principal by preventing any loss that may occur in the purchase price or basis of the security. One way to try to protect against such an occurrence is to purchase an option contract. For example, an option contract gives an investor the right, but not the obligation, to purchase or sell a certain number of shares of stocks or other types of securities at a specific price at a specific future time. An investor pays a price for the right to purchase or sell the certain number of shares at the specific price at a future date. If the investor does not purchase or sell the stock, the investor is out the money paid to purchase the option contract. However, such option contracts are complex, difficult to understand, date limited, risky, and expensive. Further, such option contracts are only available for a limited number of stocks and cannot be purchased for other securities such as mutual funds. Accordingly and unfortunately, options contracts do not offer the protection sought or needed.

Some investors have bought government bonds or debt obligations that are backed or guaranteed by a government in an attempt to protect against a decrease in value in a security. However, such bonds pay an interest rate that is below the market interest rate making it a less attractive security. Additionally, some government-backed bonds require a large amount of money to purchase these bonds. Thus, the purchases of such bonds are only practical for large institutions, banks, or companies. Again, such bonds do not allow an individual investor the opportunity to hedge their risks.

Therefore, it would be desirable to protect an asset or a security from declining in value. It is also desirable to protect an individual's portfolio or a portion of the portfolio that may be comprised of combinations of various securities. It would also be advantageous to offer a product, such as an insurance policy or a warranty policy, for protecting against a change in the value of a security. However, not only is there needed insurance for a security there is also needed a system and method for determining or calculating a premium to be paid for purchasing insurance for a security.

The present disclosure is designed to obviate and overcome many of the disadvantages and shortcomings associated with attempting to protect a security. In particular, the present disclosure is a system and method for determining a premium for insurance for a security. The present disclosure provides for the calculation of a premium for insurance, an insurance policy, or a contract that is used to insure, guarantee, or warrant against a change in value of a security, a portfolio of securities, or a portion of a portfolio of securities. Moreover, the system and method of the present disclosure can be employed to calculate a premium for insurance for a security that insures or warrants against a decrease or an increase in the price of a security. Further, the system and method of the present disclosure may be used to calculate or determine a premium to be charged for issuing a warranty policy or contract that warrants against a change in the price of a security.

SUMMARY

In one form of the present disclosure, a method for determining a premium for insuring a security comprises the steps of determining an insurance risk premium based upon a security to be insured, determining an expense and profit load, and combining the insurance risk premium and the expense and profit load to determine a total gross premium.

In another form of the present disclosure, a system for determining a premium for insuring a security comprises a computer system capable of having entered information related to a security to be insured, the computer system having a program for calculating an insurance risk premium based upon a security to be insured, for calculating an expense and profit load, and for combining the insurance risk premium and the expense and profit load to determine a total gross premium.

In still another form of the present disclosure, a method for insuring a portfolio of securities comprises the steps of determining an insurance risk premium for a portfolio of securities, determining an expense and profit load for a portfolio of securities, and combining the insurance risk premium and the expense and profit load to determine a total gross premium for a portfolio of securities.

In yet another form of the present disclosure, a system for determining a premium for insuring a portfolio of securities comprises a computer system capable of having entered information related to a portfolio of securities to be insured, the computer system having a program for calculating an insurance risk premium for the portfolio of securities, for calculating an expense and profit load for the portfolio of securities, and for combining the insurance risk premium and the expense and profit load to determine a total gross premium for the portfolio of securities.

In light of the foregoing comments, it will be recognized that the present disclosure provides a system and/or a method for determining a premium for insurance for a security which insures or warrants against a loss or decline in the purchase price or the value of a security as well as a profit or increase in the value of a security as in the case of a short sale.

The present disclosure provides a system and method for determining a premium for insurance for a security.

The present disclosure also provides a system and method for determining a premium for insurance for a portfolio of securities or a portion of a portfolio of securities.

The present disclosure provides a system and method for determining a premium for insurance for a security that is easy to use and understand.

The present disclosure also provides a system and method for determining a premium for insurance for a security that provides for the selection of various parameters of an insurance policy.

The present disclosure provides a system and method for calculating a premium to be charged for issuing a warranty policy or contract that warrants against a change in the price of a security.

These and other advantages of the present disclosure will become apparent after considering the following detailed specification in conjunction with the accompanying drawings, wherein:

DETAILED DESCRIPTION OF PREFERRED EMBODIMENTS

Figure 1:
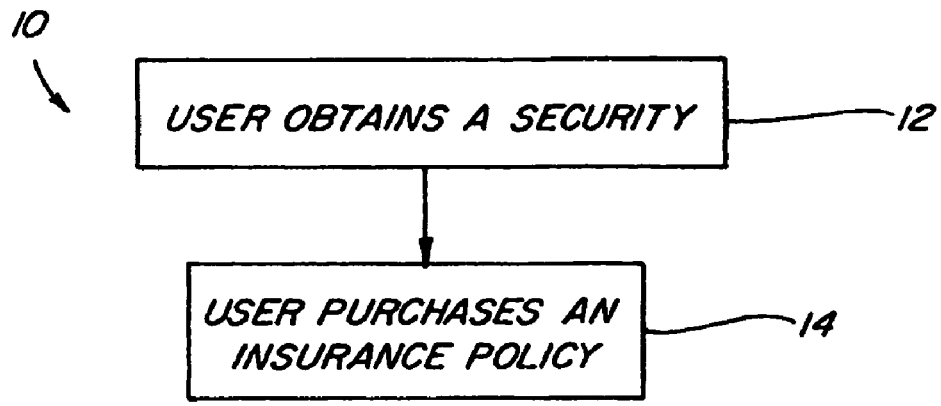
FIG. 1 is a flow chart diagram illustrating a preferred operation of the method for insuring a security according to the present disclosure.

Referring now to the drawings, wherein like numbers refer to like items, number 10 identifies a preferred method for insuring a security according to the present disclosure. With reference now to FIG. 1, the method 10 is shown to comprise a first step 12 in which a user obtains, acquires, or purchases a security. Examples of securities that may be obtained, acquired, or purchased are stocks, bonds, mutual funds, options, commodities, futures, derivatives, stock index futures, certificates of deposit, and exchange traded funds. A second step 14 of the method 10 comprises a user purchasing an insurance policy to protect against a change in the value of the security obtained in the step 12. Proof of ownership or interest in the security may be required in order to purchase or issue the insurance policy. In this manner, if the value or the price of the security decreases over time, the user will have insurance against any decrease in the value or price of the security. In particular, if at the end of the insurance policy term the price of the security is below the insured value of the security, the insurance policy will pay the difference between the insured value of the security and the value or the price of the security on the day that the insurance policy terminates. It is contemplated that a claim may be made against the policy within a term of days as defined by the insurance policy. Further, it is possible and contemplated that a user may purchase the insurance policy at any time the user owns or has an interest in the security. In other words, it is not necessary that the user purchase the insurance policy when a security is initially purchased or obtained. For example, if the user purchases a share of stock on January 1 for $10 and the price of the stock increases to $15 by July 1 then the user may purchase an insurance policy on July 1 to protect against a decrease in the price of the stock as of July 1. In essence, the user may lock in the price paid for obtaining the security plus the gain in the price of the stock. It is also possible that the user may purchase the insurance policy when the security is initially purchased or obtained and later on purchase another insurance policy if the security increases in price or value. Further, it is possible that the insurance policy may protect against a gain in the price or value of a security in the case of a short sale. A security may be obtained in several ways as by gift, inheritance, purchase, settlement, wager, theft, discovery or treasure, contract, or by agreement.

Figure 2:
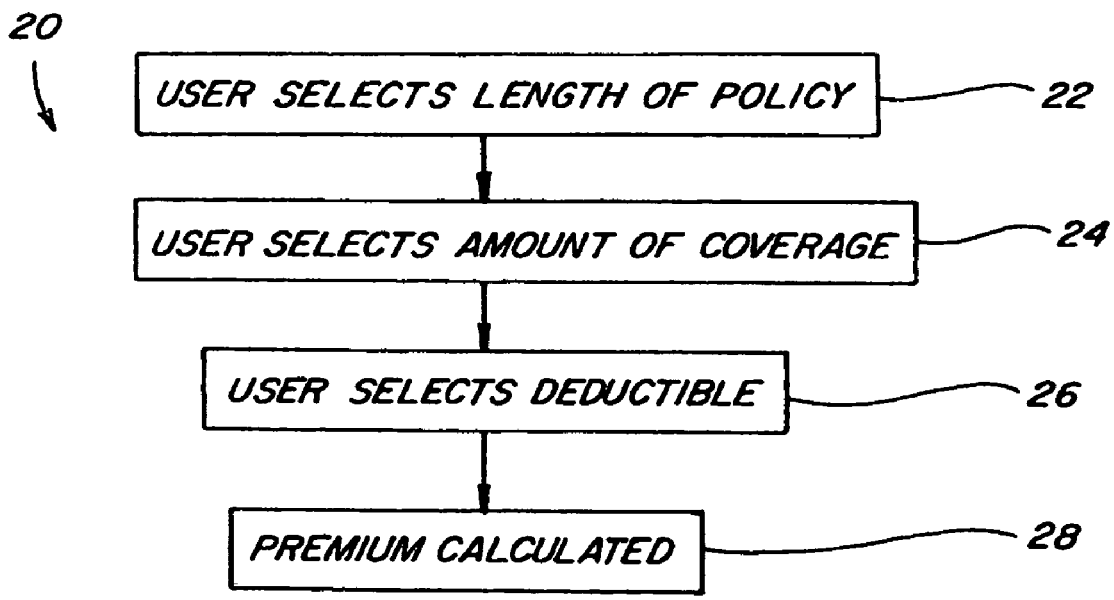
FIG. 2 is a flow chart diagram illustrating a method for selecting insurance policy requirements.

FIG. 2 shows a process for the user to use in selecting policy requirements for purchasing the insurance policy. The policy requirements include various parameters that may be selected prior to purchasing an insurance policy. In a first step 22, a user selects the length or term of the insurance policy. For example, the user may want to insure against a loss in the purchase price or the value of a security for a term of one year. Further, any decrease occurring after the end of the term selected is not covered by the insurance policy. As another example, the user may want to insure against an increase in the value or price of a security. Once the length is selected, the user selects the amount of coverage as shown in a second step 24. The user may decide that only insuring a portion of the value or the price of the security is required or desired. For example, if a security having a value of $100 is purchased, the user may decide that only half of this amount or $50 needs to be insured. After selecting the amount of coverage, the user needs to decide if the user is willing to include a deductible as part of the policy. In a next step, step 26, the user is required to determine whether the user will accept a deductible prior to the insurance policy paying out some amount of coverage. By way of example, the user may select a deductible as a dollar amount as will be explained further herein. In a next step, step 28, a premium amount is calculated based upon parameters such as policy length, policy amount, and policy deductible. Other parameters may be taken into consideration for the calculation of the premium amount. Such other parameters may include the number of shares to be insured, the current share price, interest rates, and volatility. These listed parameters are for purposes of example only and are not inclusive.

Figure 3:
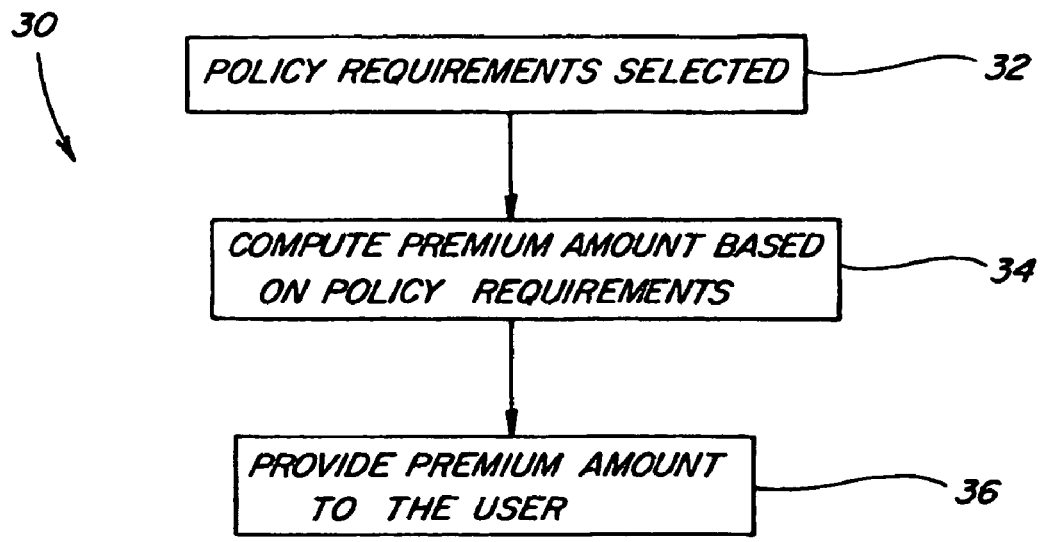
FIG. 3 is a flow chart diagram illustrating a method for calculating a premium amount.

With reference now to FIG. 3, a flowchart illustrates a process 30 for calculating a premium amount. First, in a step 32, the user selects policy requirements that may include identification of the security, policy term, policy amount, and policy deductible. Once the policy requirements are selected a premium amount is calculated based on the policy requirements. This is accomplished in a step 34. The volatility of a security may be one factor in determining a premium. Higher volatility in the share price of a security will, generally, result in a higher premium. Also, a coverage period of a long term may impact the price of the premium. The amount of coverage, the term, and the deductible amount, if any, may impact the calculated premium amount. Once calculated, the premium amount is provided to the user in a step 36.

Figure 4:
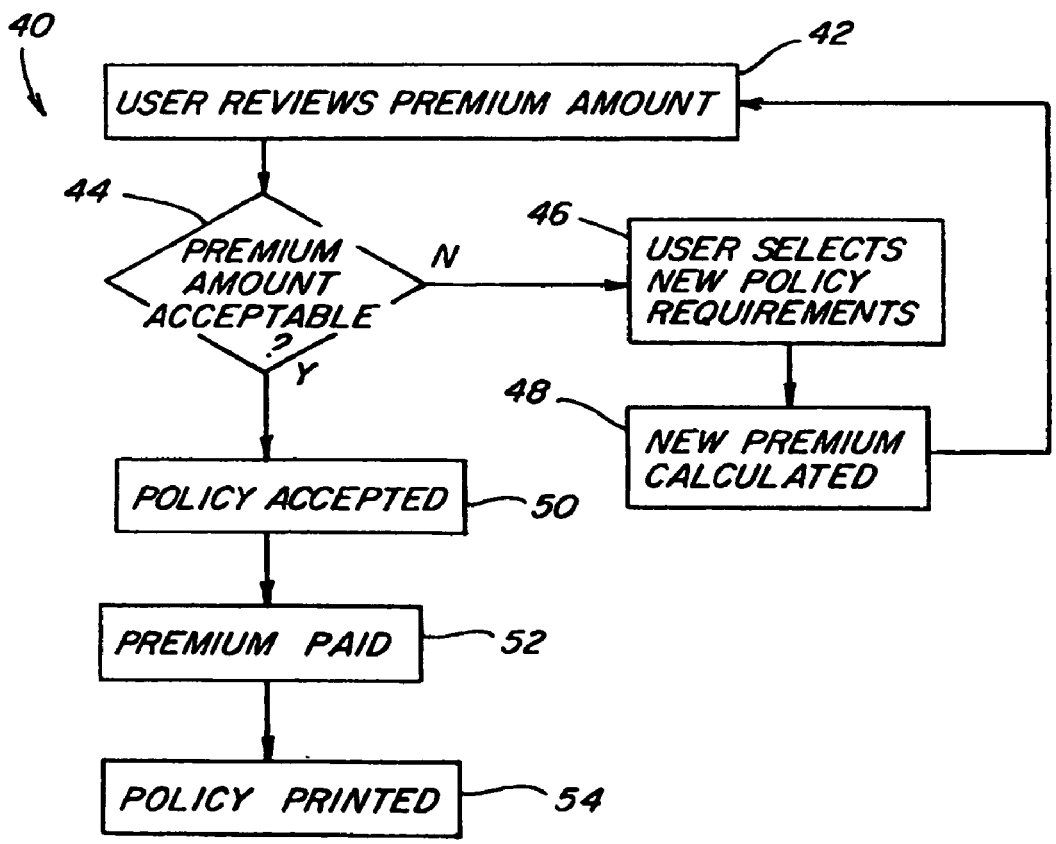
FIG. 4 is a flow chart diagram illustrating a method for preparation of a insurance policy.

FIG. 4 is a flowchart that illustrates a process 40 for creating an insurance policy for a security. The user reviews or evaluates the premium amount that has been calculated based on various policy requirements in a step 42. Once the evaluation is completed, the user determines, in a step 44, whether the premium amount is acceptable. If the premium is not acceptable then the user enters new policy requirements in a step 46. As discussed previously, new policy requirements may include policy term, policy amount, or policy deductible. In a next step 48, a new premium amount is calculated based upon the new policy requirements entered in the step 46. The new premium amount is provided to the user in the step 42 where the user again reviews the premium amount.

If in the step 44 the user determines that the premium amount is acceptable, a next step 50 is encountered where the insurance policy is accepted. Next, in a step 52, the premium amount is paid by the user. Finally, in a step 54, the insurance policy is issued, written, printed, or provided to the user. It is also possible that steps 52 and 54 may be reversed. In particular, the insurance policy may be provided to the user with a bill or invoice to pay the premium amount. It is also contemplated that the insurance policy may be issued in electronic form in that the policy may be sent electronically via e-mail as a text file or a PDF file, or the policy sent or presented on a CD-ROM.

Figure 5:
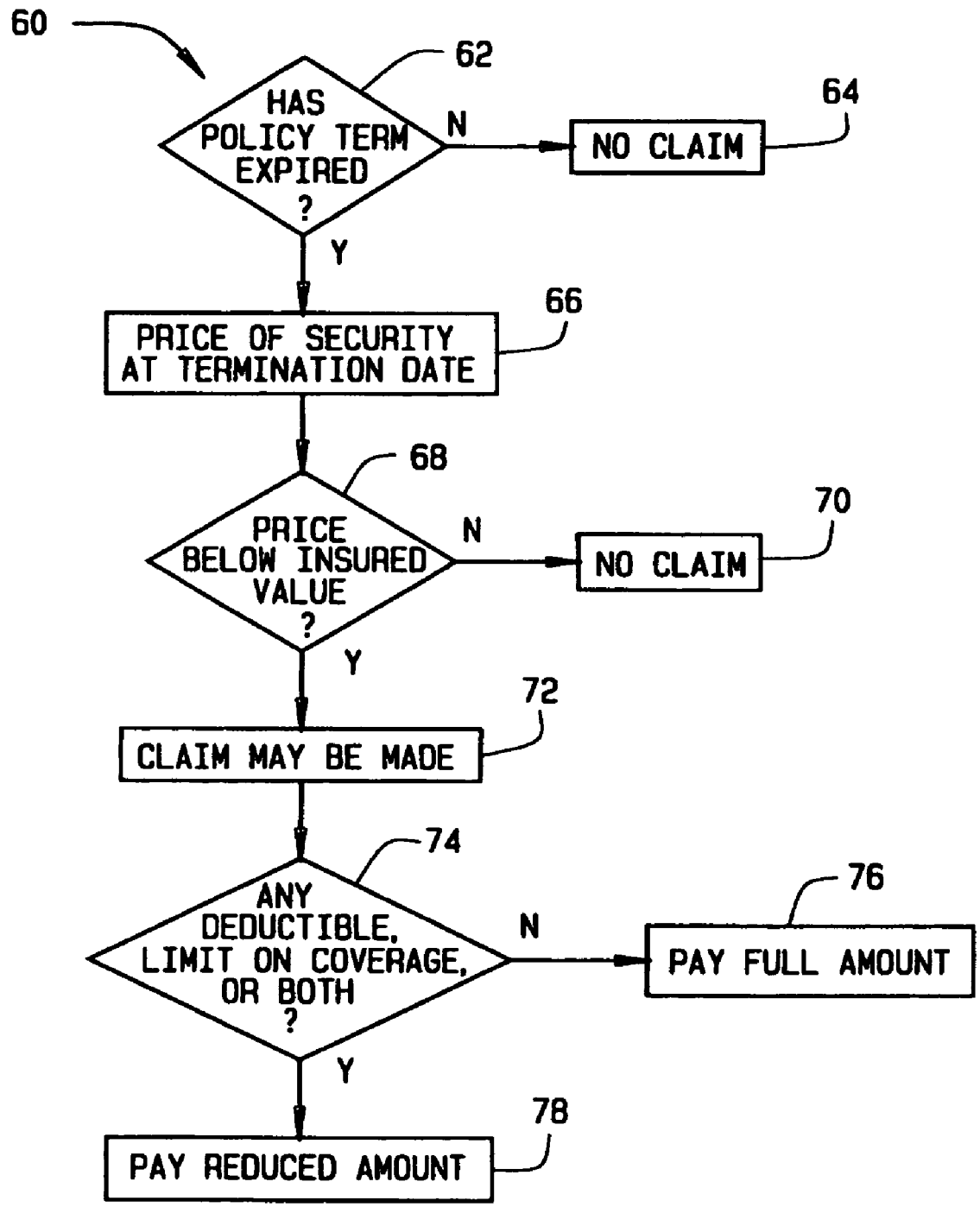
FIG. 5 is a flow chart diagram illustrating a method for determining whether a claim may be made against an insurance policy for insuring a security.

Referring now to FIG. 5, a flow chart illustrates a method 60 for determining whether a claim may be made against an insurance policy for insuring a security. The method 60 commences with a first step 62 in which it is determined whether the term of the insurance policy has expired. If it is determined that the term of the policy has not expired then no claim may be made as is shown in a step 64. If on the other hand it is determined that the term of the policy has expired then the price of the security on the last day of the term is reviewed in a step 66. In a next step 68, it is determined whether the price of the security on the last day of the term of the policy is below the insured value. If it is not then no claim may be made against the policy, as is shown in a step 70. In this particular situation the user would be out the amount of the premium paid for the insurance policy. However, as depicted in a step 72, if the price is below the insured value then a claim may be made within the terms of the insurance policy. Although it has been described that a claim may be made if the price of the security is below the insured value on the last day of the term of the policy, it is possible that the terms of the insurance policy will allow for a claim to be made during a window period. An example of a window period may be seven days prior to the last day of the term of the policy. It is also possible that the policy may allow for a claim to be made during any period during the term of the policy. Prior to a payment being made under the insurance policy, it may be required to review the insurance policy, as illustrated in a step 74, to determine if there was a deductible amount, a limit on coverage, or both. If it is determined that the policy does not contain a deductible amount, a limit on coverage, or both, then the full policy amount is paid to the user. This is depicted in a step 76. In particular by way of example only, if the security to be insured was one share of stock that had a purchase price of $100 and at the expiration of the term of the insurance policy the price of the stock was $90 then the policy would pay $10 to the user. If in the step 74 it is determined that there were limitations in the policy then a reduced amount is paid to the user as is shown in a step 78. For example, using the same numerical amounts as above, and assuming a $5 deductible, then the policy would pay to the user $5. If the policy had a limit that it would pay for 95% coverage then the insurance policy would pay $5 to the user. In case of a short sale, if there is an increase in the value or price of the share or shares shorted then the policy would make a payout to the user.

Figure 6:
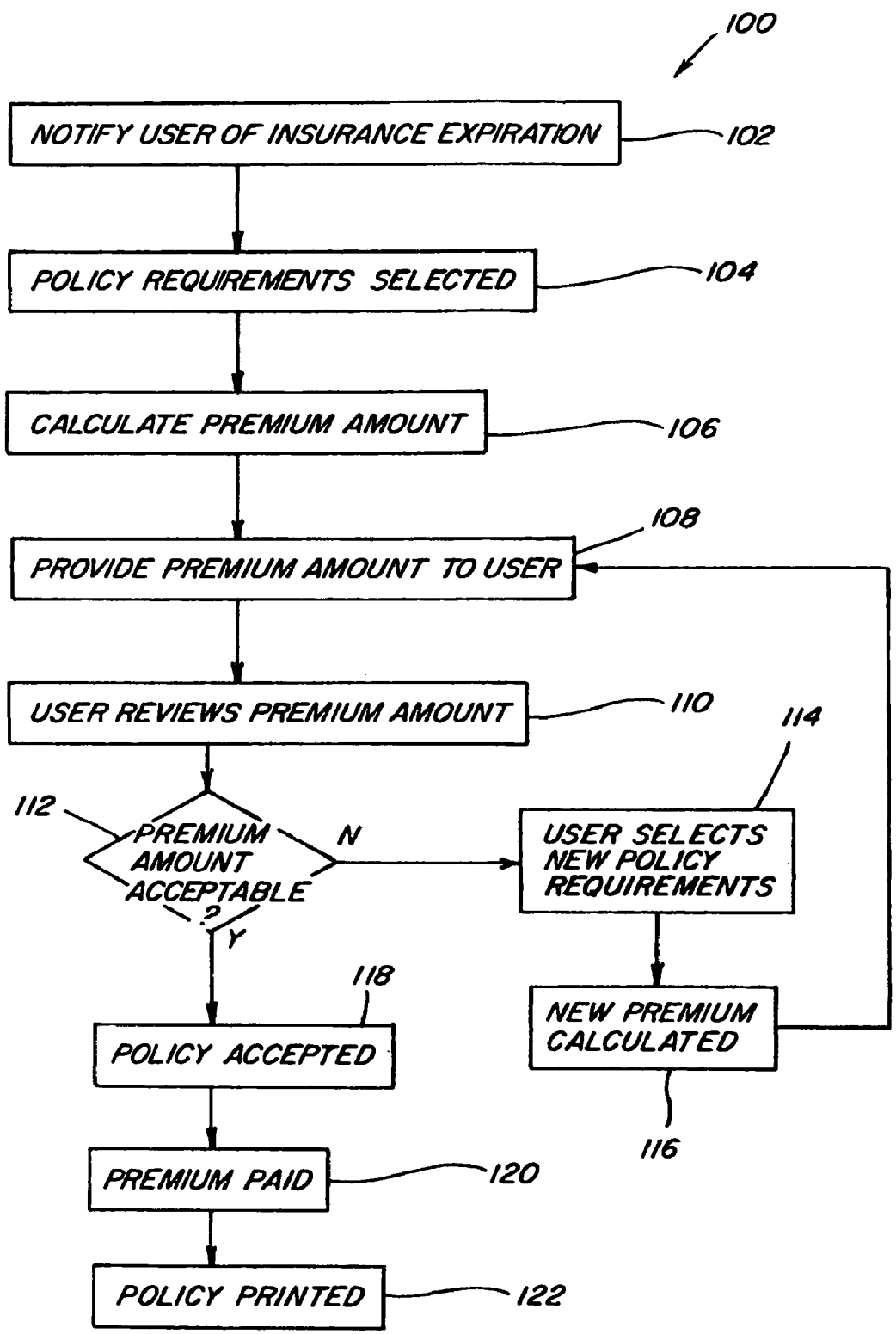
FIG. 6 is a flow chart diagram illustrating a method for renewing a insurance policy.

FIG. 6 shows a flow chart of a process 100 for renewing an insurance policy for insuring a security. In a first step 102 the user is notified of the expiration of the insurance policy. In a next step 104 the user is able to select new policy requirements for a renewed insurance policy for insuring a security. In the step 104 the user may select such parameters as a new policy term, a new amount of coverage, a new deductible amount, and a new price for the security or the parameters may remain the same as in the original policy. After the user selects the policy requirements a premium amount is calculated in a step 106. Once the premium has been calculated the premium amount is submitted to the user in a step 108. The user reviews the premium amount in a step 110. A determination is made in a step 112 as to whether the premium amount is acceptable. If the amount is not acceptable then the user may select new policy requirements in an attempt to lower the premium amount. This is indicated in a step 114. Upon selection of new policy requirements another premium is calculated in a step 116. Once the new premium is calculated the new premium is submitted to the user in the step 108. If in the step 112 it is decided by the user to accept the premium amount the policy is accepted by the user in a step 118. Further, the user in a step 120 pays the premium and the policy is issued, printed, written, or provided to a user in a step 122. As previously indicated, the performance of steps 120 and 122 may be reversed. For example, it is possible that the policy is printed and a bill is then submitted for payment of the premium.

Figures 7, 8:
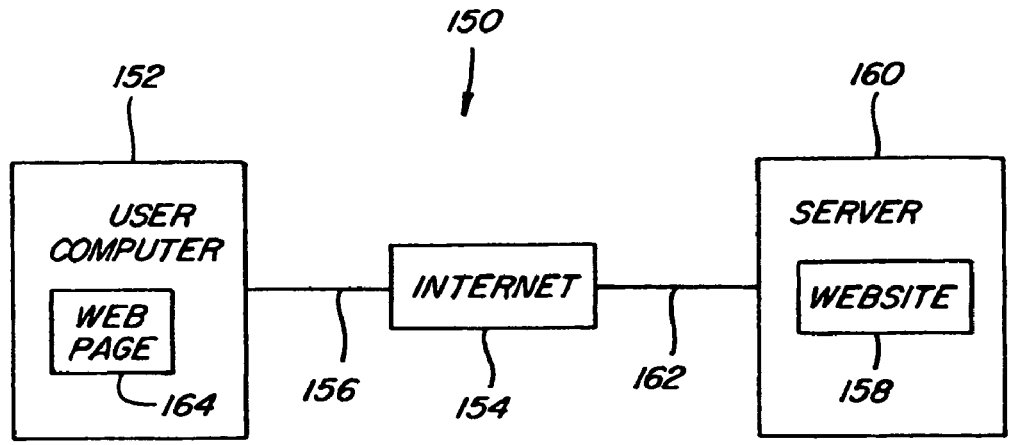
FIG. 7 is a block diagram of a system for insuring a security constructed according to the present disclosure.
FIG. 8 is an illustration of a screen that may be presented during use of the system for insuring a security to enter insurance parameters.

A system for insuring a security 150 is illustrated in FIG. 7. The system 150 is shown comprising a user computer system 152 that is capable of being connected to the Internet 154 by a communications connection 156 such as a telephone line, cable, ISDN lines, fiber optic lines, wireless connections, satellites, or other suitable means of connection. Through use of the connection 156 to the Internet 154, the computer 152 is capable of accessing a website 158 on a computer system or a server 160 over a connection 162. The website 158 may be a website of a brokerage, a bank, an insurance company, or any other entity that a user may purchase a security. As described for the connection 156, the connection 162 may include a telephone line, cable, ISDN lines, fiber optic lines, wireless connections, satellites, or other means of connection. The server 160 is capable of transmitting to the user computer 152 one or more web pages 164 for viewing by a user of the user computer 152.

The user computer 152 is allowed access to the server 160 through use of a commonly available web browser or similar software package or application. The server 160 is capable of hosting the website 158 which presents various screens or web pages 164 to the user computer 152. A user operating the user computer 152 is able to interact with the website 158 being hosted by the server 160. In particular, a user may be presented with various screens or web pages 164 with such web pages 164 presenting information concerning the purchasing of a security and the purchasing of insurance for a security. Further, the web pages 164 may have other information such as selecting a length of a policy term, an amount of coverage, a deductible amount, and entering of information concerning a security already owned.

The user may be presented with a web page or screen 170 as illustrated in FIG. 8. As shown, underwriting information or insurance parameters 172 are presented for selection or entry by the user. The user is requested to enter information concerning the name or symbol of the security to be insured in a box 174 and the number of shares to be insured in a box 176. The amount of coverage desired is entered in a box 178. For example, the user may determine that only half of the value of the security to be insured needs to be covered and this amount is placed in the box 178. The term of the policy is selected and entered in a box 180. The user can determine the length of the term of the policy. Also, if a deductible amount is to be factored into the calculation of the premium, the user may enter a deductible amount in a box 182. Once the user has entered the insurance parameters 172, a button 184 may be selected to transmit the insurance parameters 172 to the server 160 in order to determine or calculate a premium for insuring the security presented in the box 174.

Figure 9:
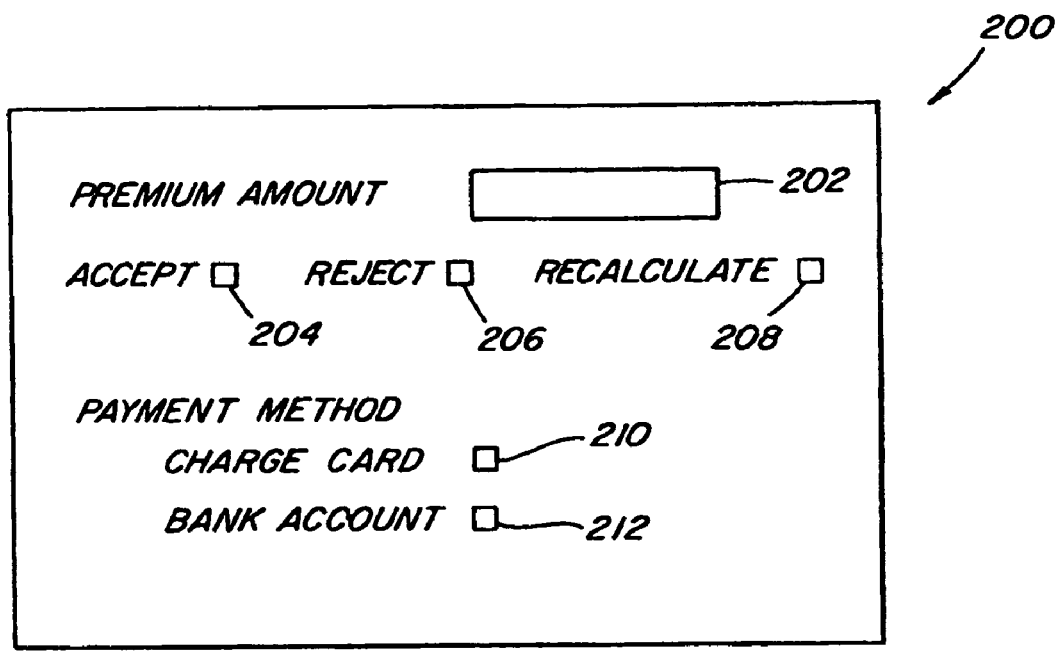
FIG. 9 is an illustration of a screen that may be presented during use of the system for insuring a security to accept a premium.

Once the server 160 receives the insurance parameters 172, a premium is calculated. The premium amount is then sent to the user computer 152 to be displayed as a screen or a web page 164. FIG. 9 depicts a web page 200 that may be presented on a display associated with the user computer 152. The web page 200 has a box 202 in which the premium amount is displayed for review by the user. The user may accept the premium amount by selecting a button 204, reject the premium amount by selecting a button 206, or recalculate a premium amount by selecting a button 208. If the button 204 is selected, the user may be requested to indicate a payment method for the premium amount. If the premium is to be paid by a credit card then a box 210 is selected and the user is taken to a new web page to enter further information concerning the credit card. If the premium is to be paid by a bank account then a box 212 is selected and a new web page is presented for entry of bank account information. Other methods of payment, such as cash, check, invoice, or being billed are contemplated and possible and such methods may be incorporated into the web page 200. If the user decides that the premium amount is too high and insuring the security is to be foregone then the box 206 is selected and the user may be taken to a home page of the server 160. On the other hand, if the user selects the box 208, the user will be presented the web page 170 again to enter insurance parameters 172 in an attempt to recalculate the premium amount. For example, the premium amount presented in the box 202 may be more than the user wants to pay. In order to reduce the premium amount the user selects the box 208 and the web page 170 is presented for entry of other amounts. The user, in an attempt to lower the premium, may enter into the box 182 a higher deductible amount. In this manner, the premium amount is recalculated and the recalculated amount for the premium may be low enough that the user selects the accept box 204. As can be appreciated, several other web pages may be presented to the user. By way of example, web pages may be presented that include the conditions and terms of the insurance policy and payment confirmation.

Although not shown, the computer system 152 may include peripheral devices such as a keyboard, a speaker, a display, a printer, a modem, a network card, and any other suitable device. The computer system 152 may be a personal computer having a microprocessor, memory, a hard drive having stored thereon an operating system and other software, and input devices such as a mouse, a keyboard, a CD-ROM drive, or a floppy disk drive. The computer system 152 may also be a PDA type device, a cell phone, or other hand held type computer device that allows for receiving and transmitting information or data. Further, the server 160 may take on various known forms for a server including a personal computer, a computer system, or a network. Also, although the Internet 154 is disclosed, it is also possible that the system 150 be located on a LAN or other closed network system.

Figure 10:
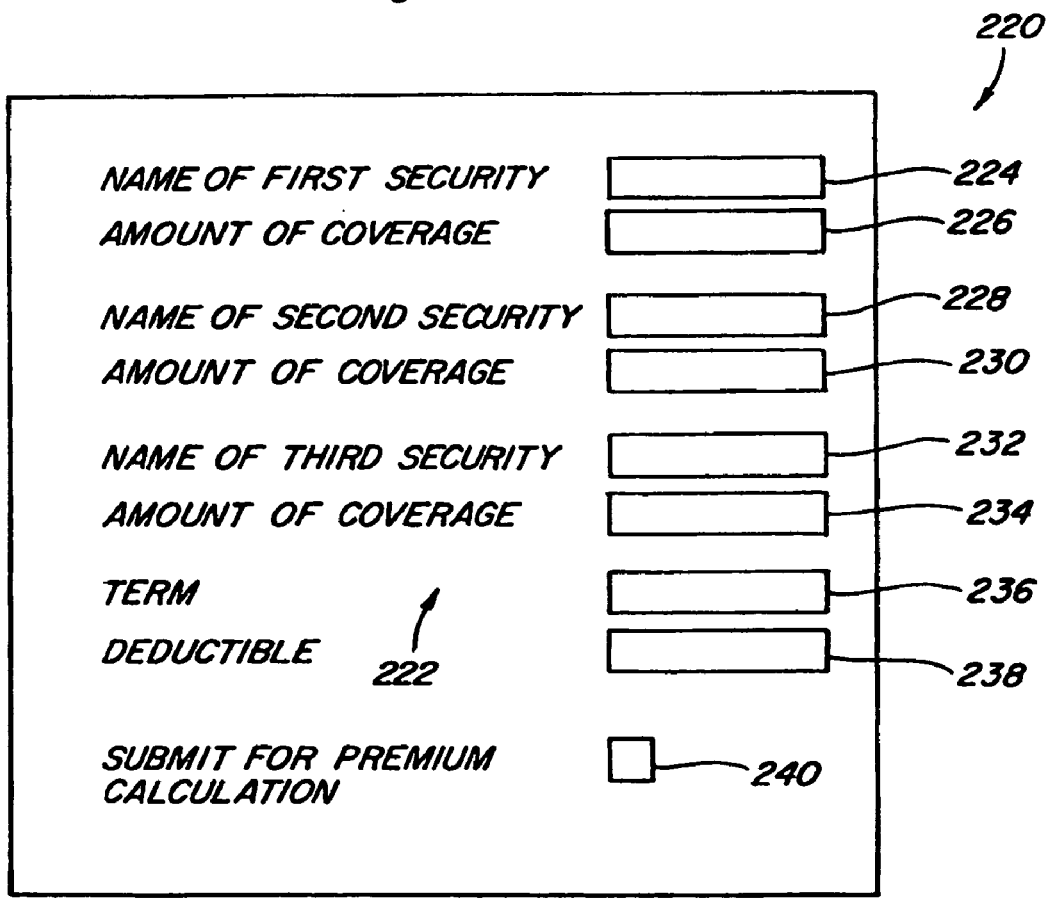
FIG. 10 is an illustration of a screen that may be presented during use of the system for insuring a security to enter insurance parameters for a portfolio of securities.

It is also possible to insure a number of securities or a portfolio through use of the present disclosure. With reference now to FIG. 10, a web page 220 is illustrated that provides for entry of more than one security for calculating one premium to insure the securities or the portfolio. The web page 220 requests the user to enter various insurance parameters 220. In a box 224, the name of the first security is entered. Below the box 224 is a box 226 in which the amount of coverage for the first security is entered. Once the information for the first security has been entered, information relating to a second security and a third security may be entered in boxes 228, 230, 232, and 234. After the security information has been entered the term for the insurance policy is entered into in a box 236. A deductible amount, if any, is entered in a box 238. After all of the insurance parameters 222 have been entered then a button 240 may be selected to calculate a premium amount. The information relating to the insurance parameters 222 are transmitted to the server 160 in order to determine or calculate a premium for insuring the securities presented in the boxes 224, 228, and 232. It is also possible that there are more boxes for entering other securities or other web pages similar to the web page 220. It is also contemplated that the term and the deductible amount may be individually selected for each security. In this manner, a portion of the portfolio of securities may be insured. For example, the first security entered may be covered for 100% value and have no deductible, the second security entered may be covered for 50% value and have a deductible amount selected, and the third security entered may not be covered at all. Further, a listing of individual premiums per security may be provided in which a user may select which security will be insured. It may be that the premium for one of the securities to be insured is determined to be too high and the user may select not to insure this particular security.

Although the present system and method have been described by use of electronic means, it is also possible that an agent, a broker, or other salesperson may provide the policy to a user. For example, an agent may discuss the various securities to be insured and provide a quote for coverage to a user. The user may review the quote and then determine whether to insure the security or securities. In this manner, the user does not directly interact with the system and relies on the agent for information and the premium quote. Also, the agent or the system may already have predetermined premiums or policies for any type security, for any amount of coverage, for any length or term, and for any deductible amount. The user may select the insurance policy and premium from a listing of the predetermined premiums or polices.

Figure 11:
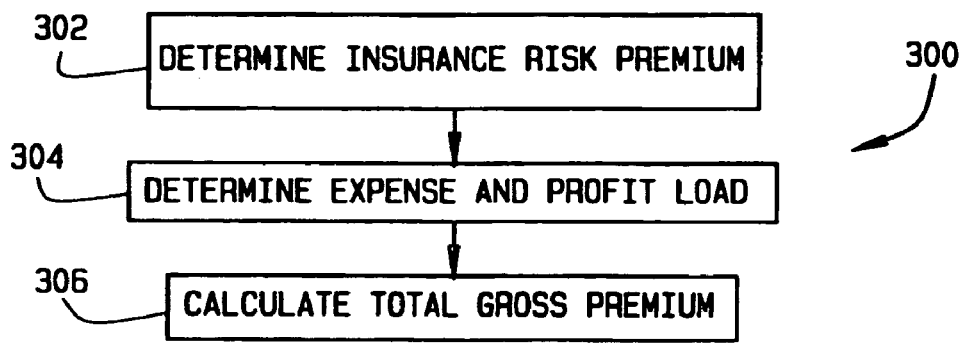
FIG. 11 is a flow chart diagram of a method for determining a premium for insurance for a security.

With particular reference now to FIG. 11, a flow chart diagram of a method for determining or calculating a premium for insurance for a security 300 is shown. In a first step 302, an insurance risk premium or a net single premium is determined. The insurance risk premium may be based on such factors as the insured amount, the term of coverage, and the current price of the security to be insured. Once the insurance risk premium is determined an expense and profit load is then determined in a step 304. In a next step 306, the insurance risk premium and the expense and profit load are added together to arrive at a total gross premium. The total gross premium is the amount an investor will pay to insure a security. The total gross premium may be presented via the web page 200 in the box 202 to be displayed for review by the user or the investor, as is shown in FIG. 9.

Pricing for determining a premium for insurance for a security is based on a calculation that protects an investor against a change in the value of the security the investor owns during the term of coverage. The pricing methodology involves determining an insurance risk premium or a net single premium and an expense and profit load added to the net single premium. The calculation for determining an insurance risk premium may be based on the assumption that the underlying insurance risk in an insurance policy for insurance for a security which protects against a decrease in the value of the insured security during a term of coverage is equivalent to the price of a put option on that security with a strike price equal to the insured amount and a term of coverage equal to the time to expiry. The basic Black-Scholes options pricing formula can be used to price European style options with no provision for dividends. Generally, dividends have only a small impact on the price of an option and in the calculations performed herein dividends are ignored. However, it is possible and contemplated to include dividends when performing the calculation to determine a premium. Further, it is also contemplated to employ other options pricing formulas or algorithms to determine an insurance risk premium such as Binomial Pricing, Flexible Binomial Pricing, Finite Difference, and Analytic Approximation.

The expense and profit load is added to the net single premium covering the insurance risk to obtain a total gross single premium for insurance for a security. In order to achieve a competitive gross single premium for the insurance policy the expense and profit load needs to be reasonably related to the commissions and other expenses an investor might incur in order to put a similar hedging program into effect using exchange traded options.

The Black-Scholes formula for pricing an European put option is as follows:

$$p = Ke^{-rt}N(-d_2) - SN(-d_1)$$

where K=the insured amount, r=the risk free interest rate, t=the term of coverage, S=the current stock price, $d_1 = \ln(S/K) + (r + \sigma^2/2)t/\sigma\sqrt{t}$, and $d_2 = d_1 - \sigma\sqrt{t}$. The function N(x) denotes the standard normal cumulative distribution function. Also, a means volatility that is the annual standard deviation of the stock price and is expressed as a percentage or as a decimal number. For example, a volatility of 25% would be applied as 0.25 in the formula.

With respect to determining a premium for insurance for a security, the following pricing data may be applied in the above formula to effectively calculate a net single premium or insurance risk premium. The pricing data taken from the application would include the following. The stock or security name and symbol would be provided by the investor in an application for insurance coverage or obtained from the investor's brokerage house records. The number of shares owned or on which insurance coverage is desired would be provided by the investor or looked up on the investor's brokerage house records. The insured amount (K) would be the current value of the shares the investor wishes to insure less any deductible selected by the investor on the application. The deductible could be a percentage expressed in decimal form, for example, 10% would be expressed as 0.10 such that the insured amount=current share value−deductible. Alternatively, the deductible could be expressed as a dollar value such as $5 such that the insured amount=current share value−deductible. The total insured amount would reflect the number of shares owned. The term of coverage (t) would be provided by the investor or proposed in an insurance offer made to the investor.

Other pricing data could come from readily available information. The current stock price (S) would be determined from the investor's brokerage house records or determined by a lookup on one of the many stock price quote services. The insured amount is the equivalent of the strike price in the Black-Scholes option pricing formula.

The r or risk free rate of return can be based on the Federal Funds rate or U.S. Government securities for a term similar to the term of coverage. As of Apr. 15, 2005, by way of example, the Federal Funds rate was 2.78%. For one year government securities the rate on Apr. 13, 2005, was 3.32%. Interest would have only a minor impact on the pricing of a put option of short duration and, in any event, low interest rates tend to increase the price of a put. Therefore, in the interest rate environment noted for Apr. 13, 2005, a rounded risk free rate of return of, say, 2.75% might be used in pricing since it is at the low end of the range used. However, another interest rate assumption near the observed rates might also be used and chosen taking into account interest rate volatility such that it could be used in pricing calculations for a reasonable period of time without daily changes.

Volatility can be measured historically. However, the volatility used in the pricing calculation ought to represent market expectations with respect to the future movement of the price of the underlying insured security. This volatility can be derived by solving for the volatility implied by exchange traded options on the underlying insured security for similar durations.

It is contemplated that an insurer providing insurance for a security could hedge its insurance risk in a number of ways. One way would be to purchase exchange traded options to offset the securities price change risk the insurer was assuming. Since exchange traded options are American style options, which can be executed anytime prior to the exercise date, such options can be purchased to cover the general risks assumed through the sale of insurance for a security that, essentially, provide European style options. In addition, it is assumed that transaction costs for an insurer purchasing options as a hedge against the issuance of insurance for a security would be significantly lower than the expenses built into the pricing of insurance for a security. The difference between the built in implicit trading costs and the actual trading costs incurred under this approach would provide a source of profit.

Another way to hedge would be to purchase options exactly equivalent to the options embedded in the insurance for a security from a willing derivatives investor or by assigning the option pricing risk directly to a willing derivatives investor. Such an investor might even participate in pricing the net single premium designed to cover the insurance for a security product's insurance risk.

A further method that can be used to hedge is by purchasing insurance for a security reinsurance from a reinsurer. The availability of insurance for a security creates a new reinsurance marketing opportunity. An insurance company providing insurance for a security directly to individual investors could reinsure the insurance risk with a reinsurance company willing to take on the investment risk inherent in the insurance for a security product.

Another manner in which to hedge is to include or add risk margins to the insurance risk charge, referred to herein as the net single premium with little impact on the product's competitive position. Such risk margins could significantly reduce the risk that the net single premium component of the premium would be inadequate to cover the investment risk being assumed by the insurer.

Other methods or approaches to hedging the insurance risk are possible depending on the form of insurance for a security that is offered. The above examples are not meant to be exhaustive but illustrative.

The following is a calculation of a premium for insurance for a security with the security being a particular stock that is traded on a stock exchange. In this example the stock for General Electric Company, New York Stock Exchange symbol GE, will be used. In particular, such calculation for this security is based on values for this security on Apr. 21, 2005. Also, near-the-money exchange traded put options were used to calculate implied volatility for various terms to expiry. The Black-Scholes formula was used having the following input: the term to expiry was calculated in days to the option date and then converted to a fraction of a year; an exercise (strike) price nearest to the current stock price was selected; the risk free interest rate is 2.75%; and the exchange traded option price was used as a target in the spreadsheet program's goal seek function to solve for the volatility that would produce the market option price.

Table 1 illustrates the calculation of implicit volatility for GE stock.

For practical purposes, a reasonable level for expense loads would be set or modeled by the trading expenses an investor might otherwise incur if the investor were to use more traditional means to protect owned securities from a decline or a change in value. These traditional means may involve the

TABLE 1

| BLACK-SCHOLES | Symbol | Today Apr. 21, 2005 | | | | | |
|---|---|---|---|---|---|---|---|
| Exercise Price | K | 35.00 | | | | | |
| Current Stock Price | S | 35.80 | | | | | |
| Expiry | | May 21, 2005 | Jun. 18, 2005 | Sep. 17, 2005 | Dec. 17, 2005 | Jan. 21, 2006 | Jan. 20, 2007 |
| Days | | 30 | 58 | 149 | 240 | 275 | 639 |
| Duration (in years) | t | 0.082192 | 0.158904 | 0.4082192 | 0.6575342 | 0.75342466 | 1.75068493 |
| Calculated Implied Volatility | v | 0.17417 | 0.15973 | 0.18726 | 0.19315 | 0.20514 | 0.22312 |
| Rounded Implied Volatility | | 0.18 | 0.16 | 0.19 | 0.20 | 0.21 | 0.23 |
| | $d_1 =$ | 0.52283 | 0.45540 | 0.34255 | 0.33805 | 0.33231 | 0.38724 |
| | $d_2 =$ | 0.47290 | 0.39173 | 0.22291 | 0.18143 | 0.15425 | 0.09203 |
| | Put = | 0.35 | 0.50 | 1.15 | 1.55 | 1.80 | 2.95 |

The calculated implied volatilities in this example have a skew by term to expiry. From the calculated implied volatility values, smoothed forecast volatilities for use in the pricing calculation may be chosen that closely match the curve by time to expiry. In practice, it is possible that a formulaic approach that makes comparisons to historic volatilities may be devised. In addition, the inclusion of a small margin in the forecast volatilities might be used.

Table 2 illustrates the application of the assumed forecast volatilities, which can vary by term of coverage, in a Black-Scholes formula to calculate the net single premium for various insured amounts and terms of coverage. For example, the net single premium for insurance for a security for GE stock protecting 90% of the stock's current value for a 90 day term of coverage would $0.18. Since GE was trading at $35.80 on Apr. 21, 2005, the insured amount would be $32.22 and the net single premium would be 0.5% (50 basis points) of the stocks then current value. The net single premium covers the insurance risk premium only. A load to cover expenses and profit would be added to the net single premium, as will be explained more fully herein.

purchase of exchange traded options and incurring the trading charges associated with such a purchase. For example, a put option could be purchased. Option trading costs vary somewhat depending upon which broker an investor uses and what type of account an investor has. Table 3 provides a range of charges for purchasing options from a number of leading brokers. The range of charges was compiled as of Apr. 21, 2005. All assume the use of Internet trading accounts with no broker assistance, except as noted.

TABLE 3

| Broker | Base Rate | Per Contract Charge |
|---|---|---|
| Ameritrade | $10.99 | $0.75 |
| Charles Schwab | | |
| More than 30 trades/Qtr | $9.95 | $0.95 |
| Less than 30 trades/Qtr | $9.95 | $1.40 |
| Automated Phone | $29.95 | $1.40 |
| Broker Assisted | $43.95 | $1.40 |

TABLE 2

| | Current | | | Deductible Factor | | | | |
|---|---|---|---|---|---|---|---|---|
| Volatility | Share Price | Term of Coverage | | 100% | 95% | 90% | 85% | 80% |
| | | | | | | Insured Amount | | |
| v | S | t | Days | 35.80 | 34.01 | 32.22 | 30.43 | 28.64 |
| 0.17 | 35.8 | 0.0821918 | 30 | 0.65555 | 0.11681 | 0.00789 | 0.00015 | 0.00000 |
| 0.18 | | 0.1643836 | 60 | 0.96098 | 0.32471 | 0.07151 | 0.00909 | 0.00058 |
| 0.19 | | 0.2465753 | 90 | 1.22492 | 0.53923 | 0.18325 | 0.04489 | 0.00732 |
| 0.19 | | 0.4931507 | 180 | 1.66002 | 0.93365 | 0.45867 | 0.19066 | 0.06454 |
| 0.21 | | 1 | 365 | 2.49279 | 1.72360 | 1.12141 | 0.67822 | 0.37566 |
| 0.23 | | 2 | 730 | 3.60708 | 2.81705 | 2.13470 | 1.56140 | 1.09534 |
| 0.23 | | 3 | 1095 | 4.12531 | 3.34828 | 2.65722 | 2.05438 | 1.54043 |

TABLE 3-continued

| Broker | Base Rate | Per Contract Charge |
|---|---|---|
| E Trade | | |
| Trades/Month = 1,500+ | $6.99 | $0.75 |
| Trades/Month = 150-1,499 | $7.99 | $1.00 |
| Trades/Month = 15-149 | $9.99 | $1.25 |
| Less than 15 Trades/Month & more than $50M+ in Assets | $11.99 | $1.50 |
| Less than 15 Trades/Month & less than $50M+ in Assets | $14.99 | $1.75 |
| T.D. Waterhouse | | |
| 30+ executed trades/Qtr | $9.95 | $1.25 |
| 9-29 executed trades/Qtr | $11.95 | $1.75 |
| Less than 9 executed trades/Qtr | $17.95 | $1.75* |
| Automated Phone* | $35.00 | $1.75* |
| Broker Assisted* | $45.00 | $1.75* |

*A per contract charge of $1.25 applies for trades involving 50+ contracts.

Trading costs may also be reduced by brokerages for large accounts. For example, if the number of trades per month is larger than the number provided in Table 3 the brokerage may contract for lower fees or charges than listed in Table 3.

A "contract" is 100 options. Therefore, for example, a Charles Schwab customer who is purchasing 500 options with less than 50 trades per month would incur trading charges equal to $16.95 calculated as: $9.95+(5 contracts× $1.40 per contract)=$16.95.

The E Trade customer would expect to pay $23.74, assuming less than 15 trades per month and a small account. The T D Waterhouse customer for the same trade and assuming less than 9 trades would be charged $26.70.

In view of these possible charges that an investor could expect to pay, it can be assumed that a reasonable per policy load of $12.00 plus a per share insured load of $0.02 could be used as a reasonable trading charge level. As will be discussed further herein, it is also possible and contemplated that other charges could be assumed or used. For example, higher or lower levels could be applied in actual practice based on the market conditions and the competitive environment.

Another monetary component or charge to consider is the cost to exercise a put option. If the underlying security declined in value during the put option term then this would require the sale of the underlying security for which trading charges would be incurred. Alternatively, the sale of the put option would incur trading charges. Table 4 illustrates brokerage commissions for stock trading for the same set of brokerages shown in Table 3. All of the following charges apply to online Internet trading.

TABLE 4

| Broker | Flat Rate for Stock Trade* |
|---|---|
| Ameritrade | $10.99 |
| Charles Schwab | |
| More than 30 trades/Qtr | $9.95 |
| 9-29 trades/Qtr | $12.95 |
| Less than 8 trades/Qtr | $19.95 |
| * Plus $0.015 for each share traded in excess of 1,000 | |
| E Trade | |
| Trades/Month = 1,500+ | $6.99 |
| Trades/Month = 150-1,499 | $7.99 |
| Trades/Month = 15-149 | $9.99 |
| Less than 15 Trades/Month & more than | $11.99 |
| $50M in Assets | |
| Less than 15 Trades/Month & less than $50M in Assets | $14.99 |
| * Plus $0.015 for each share traded in excess of 2,000 | |
| T.D. Waterhouse | |
| 30+ executed trades/Qtr | $9.95 |
| 9-29 executed trades/Qtr | $11.95 |
| Less than 9 executed trades/Qtr | $17.95 |
| * Plus $0.01 applied to each share for trades in excess of 2,500 shares | |

Stock trading charges are similar to the base rate for an option trade. A per share trading cost may apply, as noted above, for trades of a high number of shares.

While an investor could exercise the put option and sell the underlying stock, by selling an in-the-money put option just prior to the exercise date, an investor can realize the value of the put option and retain ownership of the underlying security. Therefore, this component of the expense loading can be estimated as a charge identical to the first component charge.

The use of an exchange traded option to hedge against a decline in an underlying stock's value would result in two sets of trading charges or commissions which can be used as a basis for determining an acceptable load for expense and profit to be applied in the calculation of a gross single premium. Table 5, therefore, illustrates reasonable loads for expense and profit that may be used to derive a gross single premium for insurance for a security.

TABLE 5

| Component | Per Policy | Per Share Insured |
|---|---|---|
| Purchase Option Trading Charge Component | $12.00 | $0.02 |
| Sale Option Trading Charge Component | $12.00 | $0.02 |
| TOTAL | $24.00 | $0.04 |

The per policy charge in Table 5 could be converted to a per share insured charge by dividing by the number of shares insured. For example, if 500 shares were insured the per share charge would be calculated as: 24.00/500+0.04=0.088

It is also possible that additional amounts may be added to this per share charge for an issuing entity to derive additional profit. For example, due to the economic environment, it may be possible for the entity to round up to $0.09 or even $0.10. Further, after analyzing other factors, the issuing entity may be able to realize more profit by adding to the per share charge based upon a competitive advantage or size. Also, the profit portion of the expense and profit load may be a percentage of the calculated per share charge. For example, if a 10% profit margin is desired then 10% of $0.088 may be added to the per share charge or $0.0088 would be added to the per share charge for a total of $0.0968. The calculation of the expense and profit load may be separately calculated. For example, the expense load may be determined and then the insuring entity may determine that a profit of 10% may be added to the determined expense load. The insuring entity may also consider a range for the profit load. Also, the amount of $0.088 is used as an example of how the load for expense and profit is determined. This amount includes both the expense and profit load or it may only represent the expense load and a profit load may be added as previously explained.

From the above example, the gross single premium that an investor who purchased insurance for a security would be charged can be derived or determined by adding loads for expense and profit to the calculated net single premium. The net single premium represents the insurance risk cost. For example, the gross single premium for insurance for a security per share of GE stock protecting 90% of the stock's current value for a 90 day term of coverage would be calculated as follows:

| Net single premium | $0.18 |
| --- | --- |
| Load for expense and profit | $0.088 |
| TOTAL Premium | $0.27 per share (rounded). |

On Apr. 21, 2005, when this premium was calculated, GE was trading for $35.80 per share. The insured amount would be 90% of $35.80 or $32.22 per share. The gross single premium paid by the investor would be 72.6 basis points or 0.726% of the current value of the underlying security. For purposes of example only, if 500 shares of GE stock were to be insured, then the gross single premium for a 90 day term of would be $135 (the per share premium of $0.27×500 shares insured). Of the total premium, $44 would be attributable to expenses and profit for the issuing company or entity ($0.088×500 shares).

Figure 12:
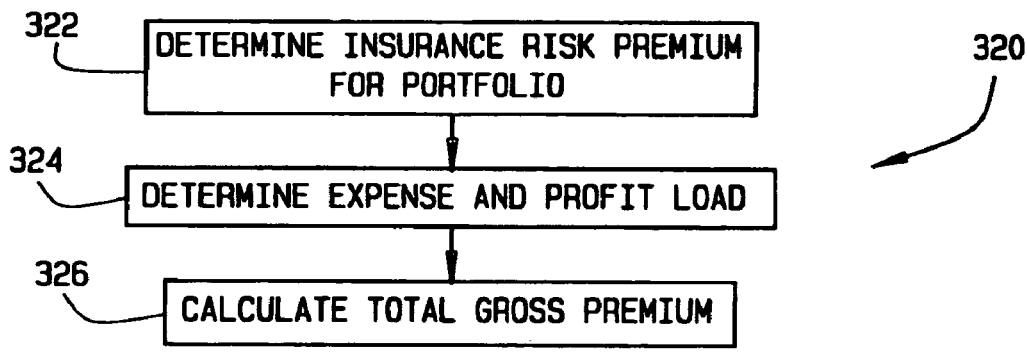
FIG. 12 is a flow chart diagram of a method for determining a premium for insurance for a portfolio of securities.

FIG. 12 depicts a flow chart diagram of a method for determining a premium for insurance for a portfolio of securities 320. In a first step 322, an insurance risk premium or a net single premium for a portfolio is determined. The insurance risk premium may be based on such factors as the insured amount, the term of coverage, and the current prices of the securities to be insured. Once the insurance risk premium is determined an expense and profit load is then determined in a step 324. In a next step 326, the insurance risk premium and the expense and profit load are added together to arrive at a total gross premium. The total gross premium is the amount an investor will pay to insure a portfolio of securities.

In order to determine a premium for a portfolio of securities the following methodology may be employed. One option would be to insure the entire portfolio with one policy so that if the value of the entire portfolio declined below the insured amount then a benefit would be paid. This requires that volatility for the entire portfolio be calculated and applied to determine a net single premium to which an expense and profit load would be added to determine the gross single premium to be charged to the investor. For this example, a portfolio consisting of four securities will be used. The four securities are GE stock, SPY, NASDAQ, and IBM stock. As previously indicated, GE is a stock traded on the New York Stock Exchange. SPY is the symbol for Standard & Poors Depositary Receipts that is an exchange traded fund (EFT) designed to track specific market indexes. NASDAQ stands for NASDAQ 100 Index Tracking Stock that is an exchange traded fund designed to track specific market indexes. The actual symbol for this security is QQQQ, but NASDAQ will be used as the symbol for the examples herein. This security is traded on NASDAQ. Also, IBM is the symbol for IBM stock traded on the New York Stock Exchange. Further, the four securities are distributed within a portfolio having the following percentages: 30% GE, 30% SPY, 30% NASDAQ, and 10% IBM. The following table, Table 6, lists these securities and the closing prices or quotes for the securities over a twenty-one day period from Mar. 23, 2005, until Apr. 21, 2005.

TABLE 6

| | | Closing Quotes | | | | Weighted |
| | | Weights | | | | |
| X | Date | 0.3 GE | 0.3 SPY | 0.3 NASDAQ | 0.1 IBM | Average Share Price |
| --- | --- | --- | --- | --- | --- | --- |
| 21 | Apr. 21, 2005 | 36.12 | 116.01 | 35.62 | 74.03 | 63.73 |
| 20 | Apr. 20, 2005 | 35.52 | 113.80 | 34.70 | 72.01 | 62.41 |
| 19 | Apr. 19, 2005 | 36.00 | 115.41 | 34.99 | 75.48 | 63.47 |
| 18 | Apr. 18, 2005 | 36.00 | 114.50 | 34.75 | 76.65 | 63.24 |
| 17 | Apr. 17, 2005 | 35.75 | 114.15 | 34.74 | 76.70 | 63.06 |
| 16 | Apr. 16, 2005 | 35.50 | 115.77 | 35.55 | 83.64 | 64.41 |
| 15 | Apr. 15, 2005 | 35.64 | 117.30 | 36.06 | 84.57 | 65.16 |
| 14 | Apr. 14, 2005 | 36.09 | 118.70 | 36.66 | 85.75 | 66.01 |
| 13 | Apr. 13, 2005 | 35.82 | 118.09 | 36.48 | 86.20 | 65.74 |
| 12 | Apr. 12, 2005 | 35.74 | 118.00 | 36.64 | 87.60 | 65.87 |
| 11 | Apr. 11, 2005 | 35.78 | 119.24 | 36.94 | 88.44 | 66.43 |
| 10 | Apr. 10, 2005 | 35.50 | 118.60 | 36.50 | 89.00 | 66.08 |
| 9 | Apr. 09, 2005 | 35.50 | 118.19 | 36.56 | 89.57 | 66.03 |
| 8 | Apr. 08, 2005 | 35.24 | 117.63 | 36.46 | 90.32 | 65.83 |
| 7 | Apr. 07, 2005 | 35.47 | 117.43 | 36.20 | 90.44 | 65.77 |
| 6 | Apr. 06, 2005 | 36.06 | 117.96 | 36.57 | 91.38 | 66.32 |
| 5 | Apr. 05, 2005 | 36.20 | 118.18 | 36.73 | 90.68 | 66.40 |
| 4 | Apr. 04, 2005 | 35.53 | 116.53 | 36.05 | 90.60 | 65.49 |
| 3 | Apr. 03, 2005 | 35.97 | 117.31 | 36.34 | 91.04 | 65.99 |
| 2 | Apr. 02, 2005 | 35.73 | 117.14 | 36.27 | 90.70 | 65.81 |
| 1 | Apr. 01, 2005 | 35.50 | 117.00 | 36.26 | 90.52 | 65.68 |

The volatility for these securities may be collected from any available source. Closing stock quotes for Apr. 21, 2005, were used to derive historical volatility measured over the twenty-one day period. The standard formula used for calculating volatility is as follows:

$$\sigma = \sqrt{\frac{\sum_{t=1}^{N}(x_t - \mu)^2}{N-1}}$$

where $x = \ln(S_t)/\ln(S_{t-1})$ when $S_t$ is the stock quote for period t and $\mu$ is the mean of the value x.

The calculated historical volatility, as shown in Table 7, is 15.9%. Note that historical volatilities for each security were also calculated and that these volatilities are different from the implied volatilities derived from market prices for current options available on these securities that are somewhat higher except for IBM. For this portfolio pricing example the volatility was set at the historical level, 15.9%, although a method giving value to the market effect on volatility as observed for the individual securities might be applied to add margin.

TABLE 7

|  | GE | SPY | NASDAQ | IBM | Weighted Average Share Price |
|---|---|---|---|---|---|
|  | 0.01675 | 0.01923 | 0.02617 | 0.02767 | 0.02095 |
|  | −0.01342 | −0.01405 | −0.00832 | −0.04706 | −0.01686 |
|  | 0.00000 | 0.00792 | 0.00688 | −0.01538 | 0.00360 |
|  | 0.00697 | 0.00306 | 0.00029 | −0.00065 | 0.00282 |
|  | 0.00702 | −0.01409 | −0.02305 | −0.08662 | −0.02115 |
|  | −0.00394 | −0.01313 | −0.01424 | −0.01106 | −0.01153 |
|  | −0.01255 | −0.01186 | −0.01650 | −0.01386 | −0.01301 |
|  | 0.00751 | 0.00515 | 0.00492 | −0.00523 | 0.00414 |
|  | 0.00224 | 0.00076 | −0.00438 | −0.01611 | −0.00208 |
|  | −0.00112 | −0.01045 | −0.00815 | −0.00954 | −0.00844 |
|  | 0.00786 | 0.00538 | 0.01198 | −0.00631 | 0.00531 |
|  | 0.00000 | 0.00346 | −0.00164 | −0.00638 | 0.00073 |
|  | 0.00735 | 0.00475 | 0.00274 | −0.00834 | 0.00305 |
|  | −0.00651 | 0.00170 | 0.00716 | −0.00133 | 0.00087 |
|  | −0.01650 | −0.00450 | −0.01017 | −0.01034 | −0.00819 |
|  | −0.00387 | −0.00186 | −0.00437 | 0.00769 | −0.00130 |
|  | 0.01868 | 0.01406 | 0.01869 | 0.00088 | 0.01377 |
|  | −0.01231 | −0.00667 | −0.00801 | −0.00484 | −0.00756 |
|  | 0.00669 | 0.00145 | 0.00193 | 0.00374 | 0.00270 |
|  | 0.00646 | 0.00120 | 0.00028 | 0.00199 | 0.00201 |
| Variance per Day | 9.5337E−05 | 8.5250E−05 | 1.3929E−04 | 5.1320E−04 | 1.0032E−04 |
| Trading Days in Year | 252 | 252 | 252 | 252 | 252 |
| Annual Variance | 0.0240250 | 0.0214830 | 0.0351021 | 0.1293255 | 0.0252812 |
| Annual Volatility | 15.5% | 14.7% | 18.7% | 36.0% | 15.9% |

The net single premiums for insurance on the entire portfolio are shown in the following Table 8. For example, for a policy that would protect against a portfolio decreasing in value by 10% or more, the net premium for a 90 day term of coverage is $0.16693 per share. The net single premium represents the insurance risk cost.

TABLE 8

| | Current | | | Deductible Factor | | | | |
|---|---|---|---|---|---|---|---|---|
| Volatility | Share Price | Term of Coverage | | 100% | 95% | 90% | 85% | 80% |
| | | | | | | Insured Amount | | |
| v | S | t | Days | 63.73 | 60.54 | 57.36 | 54.17 | 50.98 |
| 0.159 | 63.73 | 0.082192 | 30 | 1.08702 | 0.16658 | 0.00845 | 0.00010 | 0.00000 |
| 0.159 | | 0.164384 | 60 | 1.49532 | 0.42620 | 0.07045 | 0.00569 | 0.00019 |
| 0.159 | | 0.246575 | 90 | 1.79209 | 0.65613 | 0.16693 | 0.02641 | 0.00232 |
| 0.159 | | 0.493151 | 180 | 2.40977 | 1.19656 | 0.49275 | 0.15965 | 0.03857 |
| 0.159 | | 1 | 365 | 3.17844 | 1.93598 | 1.06863 | 0.52102 | 0.21886 |
| 0.159 | | 2 | 730 | 4.01157 | 2.79392 | 1.84215 | 1.13455 | 0.64490 |
| 0.159 | | 3 | 1095 | 4.47653 | 3.30224 | 2.34102 | 1.57982 | 1.00683 |

The expense and profit load can be derived or calculated in the same manner as described and shown with respect to Table 5. In this particular example, the expense and profit load will be $0.088 per share. This is assuming 500 shares are to be insured in the portfolio of securities.

The gross single premium that an investor who purchased an insurance policy to insure a portfolio of securities would be charged can be derived or calculated by adding loads for expense and profit to the calculated net single premium. Table 9 illustrates the results of the calculations for gross single premiums.

TABLE 9

| Term of Coverage | | Deductible Factor | | | | |
|---|---|---|---|---|---|---|
| | | 100% | 95% | 90% | 85% | 80% |
| | | Insured Amount | | | | |
| t | Days | 63.73 | 60.54 | 57.36 | 54.17 | 50.98 |
| 0.082192 | 30 | 1.18 | 0.25 | 0.10 | 0.09 | 0.09 |
| 0.164384 | 60 | 1.58 | 0.51 | 0.16 | 0.09 | 0.09 |
| 0.246575 | 90 | 1.88 | 0.74 | 0.25 | 0.11 | 0.09 |
| 0.493151 | 180 | 2.50 | 1.28 | 0.58 | 0.25 | 0.13 |
| 1 | 365 | 3.27 | 2.02 | 1.16 | 0.61 | 0.31 |
| 2 | 730 | 4.10 | 2.88 | 1.93 | 1.22 | 0.73 |
| 3 | 1095 | 4.56 | 3.39 | 2.43 | 1.67 | 1.09 |

Referencing Table 9 it can be seen that for insuring a portfolio the gross single premium calculation is done per average portfolio share. For a policy that will protect 90% of the average share's current value for a 90 day term of coverage the gross single premium is calculated as follows:

| Net single premium | $0.16693 |
|---|---|
| Load for expense and profit | $0.088 |
| TOTAL Premium | $0.25 per share (rounded). |

Although not shown, this charge of $0.25 would compare to an average of $0.33 to insure such security with a separate insurance policy.

If a loading on the historical volatility were used, making the forecast volatility used for pricing 18%, then the portfolio gross premium for 90% protection for a term of 90 days would equal $0.33, the same charge as for insuring each security individually.

It is important to note that there may or may not be a pricing advantage in insuring the portfolio as a whole depending on how the share prices in the portfolio change relative to each other. This is, if the share prices in a portfolio tend to move in opposite directions, then insuring the portfolio as a whole may be cheaper since the rise of one security would tend to offset the fall in another which would have a moderating effect on the volatility of the portfolio.

It is also possible that an investor may only insure specific securities within a portfolio, or insure each security in the portfolio with a separate policy each of which would pay a benefit related only to the market value fluctuation of the specifically insured security, or as outlined above, an investor would insure the entire portfolio with one policy so that only if the value of the entire portfolio declined below the insured amount would a benefit be paid.

As has been previously discussed, other options pricing formulas or algorithms to determine an insurance risk premium such as Binomial Pricing, Flexible Binomial Pricing, Finite Difference, and Analytic Approximation may be employed. Further, taxes may be included in the computation for the expense load. It is also possible that the expense load and the profit load may be calculated separately.

Figure 13:
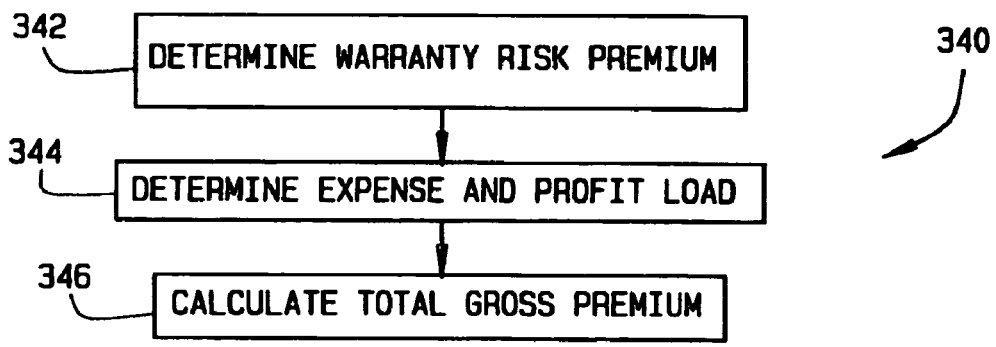
FIG. 13 is a flow chart diagram of a method for determining a premium to be charged for issuing a warranty policy or contract that warrants against a change in the price of a security.

FIG. 13 illustrates a flow chart diagram of a method 340 for determining or calculating a premium to be charged for issuing a warranty policy or contract that warrants against a change in the price of a security. In a first step 342, a warranty risk premium or a net single premium is determined. The warranty risk premium may be based on such factors as the amount to be warranted, the term of coverage, and the current price of the security to be warranted. Once the warranty risk premium is determined an expense and profit load is then determined in a step 344. In a next step 346, the warranty risk premium and the expense and profit load are added together to arrive at a total gross premium. The total gross premium is the amount an investor will pay to purchase a warranty policy. The methods outlined with respect to the method 300 may be used to determine or calculate the warranty risk premium, the expense and profit load, and the total gross premium. Further, it is also possible and contemplated that the method 340 may also be used to calculate a premium to be charged for issuing a warranty policy or contract that warrants against a change in the price of a portfolio of securities. Again, the methods set forth with respect to the method 340 may be used to determine or calculate the warranty risk premium, the expense and profit load, and the total gross premium that an investor would pay to purchase a warranty policy or contract to warrant against a change in the price of a portfolio of securities.

Figure 14:
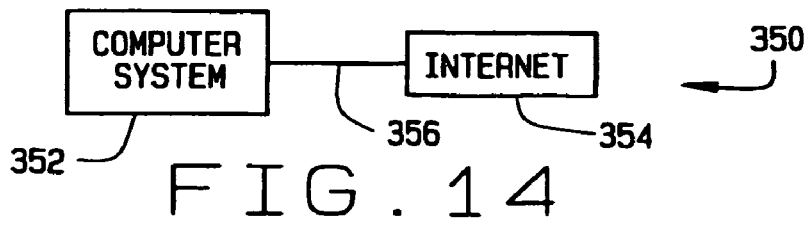
FIG. 14 is a block diagram of a system for determining a premium.

A system 350 for determining a premium for insurance for a security is illustrated in FIG. 14. The system 350 comprises a computer system 352 that may be connected to the Internet 354 via a connection 356. The computer system 352 may take on various well-known forms such as a computer having an CPU, memory, a mouse, a display, a keyboard, a communications device such as a modem, an CD ROM drive that can read or write, and a printer. The computer system 352 is capable of retrieving information from the Internet 354 to obtain information relating to historical data concerning a security and current prices of a security. It is also possible that such information may be provided to the computer system 352 by use of a CD ROM or that such information may be stored in the memory of the computer system 352. As can be appreciated, the computer system 352 is programmed to determine or calculate a premium to be charged with the program being based on the previously described methods 300, 320, and 340. A user computer, not shown, similar to the user computer 152 in FIG. 7, may be used to access the computer system 352 over the Internet 354 to obtain premium information or premium calculations. The computer system 352 may take on various other well know forms for a computer such as an PDA, a wireless telephone device, a wireless handheld device, or a wireless computer such as a laptop or a desktop computer. Further, the computer system 352 may be more than one computer and can even be an Intranet system. The connection 356 may take on various forms such as a telephone line, cable, ISDN lines, fiber optic lines, wireless connections, satellites, or other means of connection. As can be appreciated, different computer systems, computer processors, memory configurations, programming languages, and data structures may be employed or used to practice the present disclosure, and the present disclosure is not limited to a specific hardware or software platform or program.

The computer system 352 may be programmed to determine or calculate a premium using any of the above-described methods. Any suitable programming language may be employed in connection with the computer system 352.

From all that has been said, it will be clear that there has thus been shown and described herein a system and method for determining a premium for insuring a security which fulfills the various advantages sought therefore. There has also been shown and described herein a system and method for determining a premium to be charged for issuing a warranty policy or contract that warrants against a change in the price of a security that fulfills the various advantages sought therefore. It will become apparent to those skilled in the art, however, that many changes, modifications, variations, and other uses and applications of the subject system and method for determining a premium for insuring a security are possible and contemplated. All changes, modifications, variations, and other uses and applications which do not depart from the spirit and scope of the disclosure are deemed to be covered by the disclosure, which is limited only by the claims which follow.

What is claimed is:

1. A system for insuring a security against a change in value of a security comprising a computer system configured to have entered information related to a security to be insured and an insured amount of the security to be insured, the computer system configured to calculate a total gross premium for an insurance policy for insuring the security with the total gross premium being determined by calculating an insurance risk premium based upon the security to be insured and the insured amount of the security to be insured with the insurance risk premium being determined by use of an options pricing formula having an input being the insured amount of the security to be insured, determining by the computer system whether the calculated insurance risk premium is adequate, calculating by the computer system a risk margin when the calculated insurance risk premium is determined to be inadequate, combining by the computer system the calculated insurance risk premium and the risk margin to determine a net single premium, calculating by the computer system an expense and profit load similar to an expense associated with buying an option and selling an option, and combining by the computer system the net single premium and the expense and profit load to determine the total gross premium.

2. The system of claim 1 wherein the computer system is configured to calculate the insurance risk premium by determining a price for a put option for the security to be insured by use of the options pricing formula.

3. The system of claim 1 wherein the computer system is configured to calculate the insurance risk premium based on a solution to a Black-Scholes pricing formula.

4. The system of claim 1 wherein the computer system is capable of recalculating the total gross premium based upon updated security related information being entered in the computer system.

5. The system of claim 1 wherein the computer system is configured to calculate a profit portion of the expense and profit load by taking a percentage of the expense and profit load and adding the percentage to the expense and profit load.

6. The system of claim 1 wherein the options pricing formula is a Black-Scholes pricing formula.

7. A system for insuring a portfolio of securities against a change in value of the portfolio of securities comprising a computer system configured to have entered information related to insuring the portfolio of securities, the entered information comprising an identification of the securities within the portfolio of securities to be insured, a term for insuring the portfolio of securities, and an amount for insuring the portfolio of securities, the computer system configured to calculate a total gross premium for an insurance policy for insuring the portfolio of securities with the total gross premium being determined by the computer system configured to calculate an insurance risk premium for the portfolio of securities with the insurance risk premium being determined by use of an options pricing formula having an input being the insured amount of the portfolio of securities to be insured by the insurance policy, determining by the computer system whether the insurance risk premium is adequate, calculating by the computer system a risk margin when the insurance risk premium is determined to be inadequate, combining by the computer system the insurance risk premium and the risk margin to determine a net single premium, calculating by the computer system an expense and profit load for the portfolio of securities similar to an expense associated with buying an option and selling an option, and combining by the computer system the net single premium and the expense and profit load to determine the total gross premium for the portfolio of securities for the insurance policy.

8. The system of claim 7 wherein the computer system is configured to calculate the insurance risk premium by determining a price for a put option for the portfolio of securities to be insured by use of the options pricing formula.

9. The system of claim 7 wherein the computer system is configured to calculate the insurance risk premium based on a solution to a Black-Scholes pricing formula.

10. The system of claim 7 wherein the options pricing formula includes a weighted average share price of the securities in the portfolio.

11. The system of claim 7 wherein the computer system is configured to calculate a profit portion of the expense and profit load by taking a percentage of the expense and profit load and adding the percentage to the expense and profit load.

12. The system of claim 7 wherein the options pricing formula is a Slack-Scholes pricing formula.

13. A system for insuring a security against a change in value of a security comprising:
a computer system for entering information related to insuring a security the information comprising an identification of the security to be insured, a term for insuring the security, and an amount for insuring the security; and
a server system for receiving the entered information; the server system configured to calculate a total gross premium for an insurance policy for insuring the security with the total gross premium being determined by calculating an insurance risk premium based upon the security to be insured and the insured amount of the security to be insured with the insurance risk premium being determined by use of an options pricing formula having an input being the insured amount of the security to be insured, determining by the server system whether the calculated insurance risk premium is adequate, calculating by the server system a risk margin when the calculated insurance risk premium is determined to be inadequate, combining by the server system the calculated insurance risk premium and the risk margin to determine a net single premium, calculating by the server system an expense and profit load similar to an expense associated with buying an option and selling an option, and combining by the server system the server system for transmitting the total gross premium to the computer system.

14. The system of claim 13 wherein the server system is configured to calculate the insurance risk premium by determining a price for a put option for the security to be insured by use of the options pricing formula.

15. The system of claim 13 wherein the server system is configured to calculate the insurance risk premium based on a solution to a Black-Scholes pricing formula.

16. The system of claim 13 wherein the server system is capable of recalculating the total gross premium based upon the computer system having entered therein updated security related information.

17. A system for insuring a portfolio of securities against a change in value of the portfolio of securities comprising:
a computer system for entering information related to insuring the portfolio of securities, the entered information comprising an identification of the securities within the portfolio of securities to be insured, a term for insuring the portfolio of securities, and an amount for insuring the portfolio of securities; and a server system for receiving the entered information; the server system configured to calculate a total gross premium for an insurance policy for insuring the portfolio of securities with the total gross premium being determined by the server system configured to calculate an insurance risk premium for the portfolio of securities with the insurance risk premium being determined by use of an options pricing formula having an input being the insured amount of the portfolio of securities to be insured by the insurance policy, determining by the computer system whether the insurance risk premium is adequate, calculating by the computer system a risk margin when the calculated insurance risk premium is determined to be inadequate, combining by the computer system the insurance risk premium and the risk margin to determine a net single premium, calculating by the computer system an expense and profit load for the portfolio of securities similar to an expense associated with buying an option and selling an option, and combining by the computer system the net single premium and the expense and profit load to determine the total gross premium for the portfolio of securities for the insurance policy; and the server system for transmitting the total gross premium to the computer system.

\* \* \* \* \*

UNITED STATES PATENT AND TRADEMARK OFFICE
CERTIFICATE OF CORRECTION

PATENT NO. : 8,090,601 B2  
APPLICATION NO. : 13/135715  
DATED : January 3, 2012  
INVENTOR(S) : Steven S. Schuver, David D. Schuver and Thomas L. Bakos Page 1 of 1

It is certified that error appears in the above-identified patent and that said Letters Patent is hereby corrected as shown below:

Column 3, line 29, "a" should be --an--;
Column 4, line 30, after "process" insert --20--;
Column 20, line 12, "340" should be --320--;
Claim 12, line 2, "Slack-Scholes" should be --Black-Scholes--;
Claim 13, line 25, after the first occurrence of "system" insert --the net single premium and the expense and profit load to determine the total gross premium; and--.

Signed and Sealed this
Twenty-first Day of February, 2012

David J. Kappos
*Director of the United States Patent and Trademark Office*

UNITED STATES PATENT AND TRADEMARK OFFICE
CERTIFICATE OF CORRECTION

PATENT NO.        : 8,090,601 B2                                                            Page 1 of 1
APPLICATION NO.   : 13/135715
DATED             : January 3, 2012
INVENTOR(S)       : Steven S. Schuver, David D. Schuver and Thomas L. Bakos It is certified that error appears in the above-identified patent and that said Letters Patent is hereby corrected as shown below:

Column 3, line 29, "a" should be --an--;

Column 4, line 30, after "process" insert --20--;

Column 20, line 12, "340" should be --320--;

Column 22, line 21 (Claim 12, line 2) "Slack-Scholes" should be --Black-Scholes--;

Column 22, line 46 (Claim 13, line 25) after the first occurrence of "system" insert --the net single premium and the expense and profit load to determine the total gross premium; and--.

This certificate supersedes the Certificate of Correction issued February 21, 2012.

Signed and Sealed this
Twentieth Day of March, 2012

David J. Kappos
*Director of the United States Patent and Trademark Office*